Sept. 28, 1937.   G. A. LYON   2,094,325
TIRE COVER WITH HINGED FLAP
Filed June 8, 1931   2 Sheets-Sheet 1

Inventor
George Albert Lyon.
by Charles W. Wills Attys.

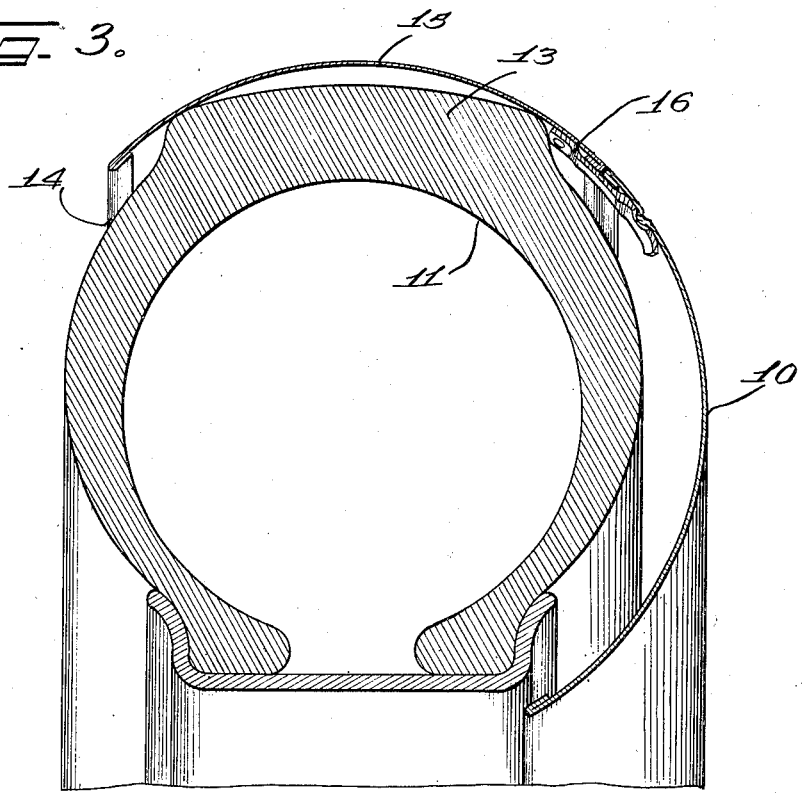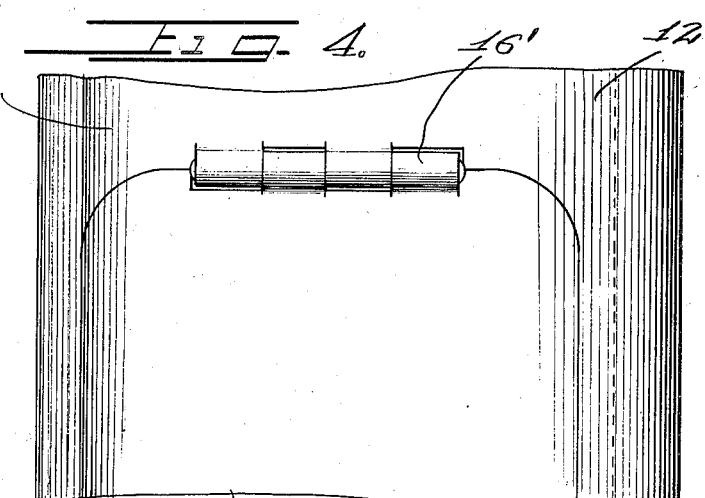

Patented Sept. 28, 1937

2,094,325

UNITED STATES PATENT OFFICE 2,094,325

TIRE COVER WITH HINGED FLAP

George Albert Lyon, Allenhurst, N. J., assignor to Lyon Incorporated, Asbury Park, N. J., a corporation of Delaware Application June 8, 1931, Serial No. 542,792

5 Claims. (Cl. 150—54)

This invention relates to tire covers and more particularly to a metallic spare tire cover of the non-collapsible type and adapted to be shoved bodily onto the tire to be protected. It is the aim of this invention to provide a tire cover including a side part for covering a wall of the tire and a tread covering part for disposition over a portion of the outer periphery of the tire with a hinged flap connected to the other parts of the cover in such a manner that when the flap is in position it will effectively retain the cover on the tire against accidental displacement from the tire.

The object therefore of this invention is to provide a tire cover which may be readily shoved onto the tire by a single movement and which after disposition on the tire may be effectively retained in position against accidental displacement by a simple movement of another part of the cover into cover retaining engagement with the tread of the tire.

In accordance with the general features of this invention there is provided a tire cover made of sheet material including a side part for covering a side wall of a tire and a rim or tread covering part of such length as not to extend around more than substantially one-half of the outer periphery of the tire and provided with a movable slot portion adapted to be moved into engagement with a portion of the tread of the tire not covered by the rim part so as to retain the cover in proper position on the tire against accidental displacement therefrom once the cover is shoved into that position.

Other objects and features of this invention will more fully appear from the following detail description taken in connection with the accompanying drawings illustrating a single embodiment thereof and in which Figure 1 is a side view of my tire cover illustrating it applied to a spare tire in a fender well of an automobile;

Figure 3 is an enlarged cross-sectional view taken substantially on the line III—III of Figure 2 looking in the direction indicated by the arrows; and Figure 4 is an enlarged fragmentary view of the hinge connection between the flap and the tread or rim part of the cover.

Figure 1:
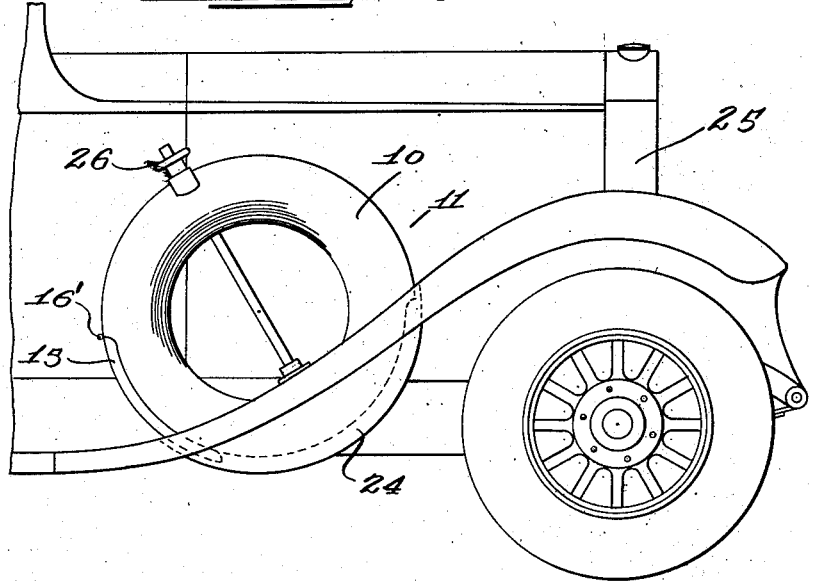

The tire cover illustrated in the drawings which may be made of any suitable sheet material such for example as sheet metal includes an annular or ring like part 10 for covering an outer side wall of the spare tire 11 and a peripheral part 12 (Figure 4) extending laterally from the side part 10 and formed to fit over the tread 13 of the tire. Both of these parts are of concavo-convex cross-section so as to conform with the contour of the surfaces of the tire over which these parts are disposed.

This tire cover of my invention is so proportioned and shaped as to enable it to be shoved with facility onto a spare tire such as a spare tire to be disposed in a fender well 24 of a motor vehicle 25. This fender well is of the usual construction as shown in Figure 1 and does not per se constitute a part of this invention. After the cover has been disposed on the tire it may be mounted in the fender well 14 and held in place by the usual spare tire and clamping means 26.

Figure 2:
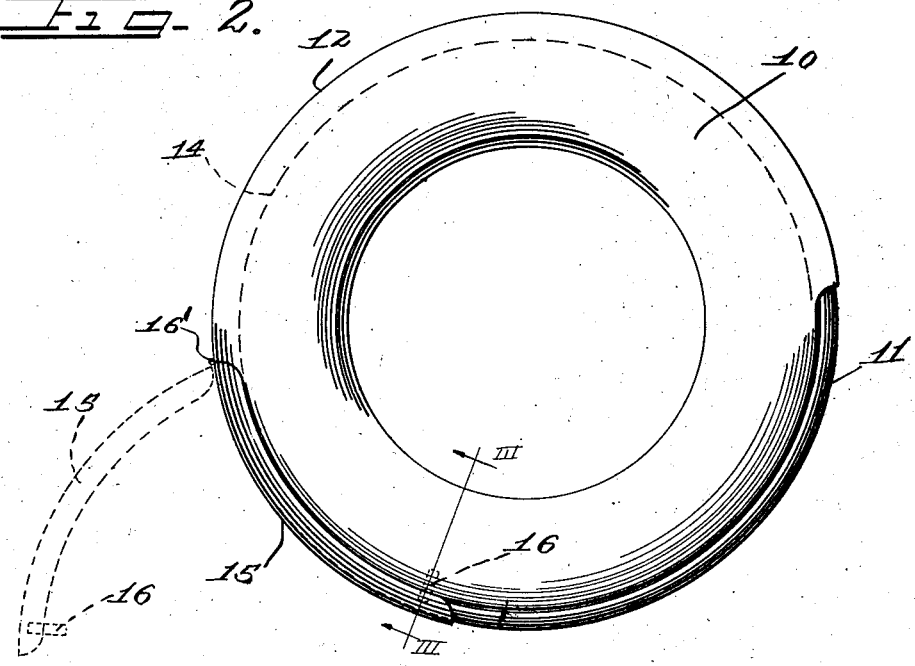
Figure 2 is an enlarged side view of the tire and illustrating in dotted lines the position to which the hinged flap is adapted to be moved when it is desired to remove the cover from the tire.

In order to enable my tire cover to be shoved by a single movement to proper tire protecting position, I have in accordance with the features of this invention made the peripheral or tread covering part 12 of such circumferential length as to cause it not to extend about more than one-half the outer periphery of the tire 11 as best shown in Figure 2. In other words, as long as this tread covering part 12 is of such length as to not cause it to extend to any extent over more than one-half the tread of the tire, the cover may be shoved by a single movement downwardly into position on the tire. If the tread covering part 12 were made of such circumferential length as to enable it to cover materially more than one-half of the outer periphery of the tire, then in order to get the cover on the tire it would be necessary to flex the inner circumferential marginal portion 14 of the tread part 12 which portion, it will be noted, extends inwardly from the outermost portion of the tread covering part 12. However, by not making the tread covering part of a circumferential length substantially greater than one-half the outer circumference of the tire, it necessarily follows that this tire cover including the two parts 10 and 12 may be readily shoved downwardly onto the tire with the part 11 in proper covering position over the outer side wall of the tire and with the peripheral part 12 fitted snugly over the tread 13 of the tire.

Then it will be noted that in order to retain this cover against accidental displacement from the tire, I provide an additional means in the form of a pivotally supported flap portion 15 movable into cooperation with the section of the tread not covered by the part 12. This flap portion 15 is of exactly the same curvature as the tread covering part 12 and in fact constitutes a continuation of the tread covering part. It will be noted from Figures 2, 3 and 4 that this flap portion 15 is so connected to the tread and side parts 12 and 10 as to enable it to line up with these parts and provide a symmetric construction.

One end of this curved flap portion 15 is hingedly connected as indicated at 16' in Figure 4 to the tread covering part 12 so as to enable it to be moved toward and away from the section of the tread not covered by part 12 as best shown in Figure 2. In Figure 2 the dotted line position of the flap portion 15 indicates the position in which it is disposed immediately after the shoving of the tire cover onto the tire and the full line position of the flap portion 15 indicates the position in which it is moved for cooperation with the tire to retain the cover against accidental displacement from the tire.

Any suitable means may be provided for holding the flap portion 15 in the full line position shown in Figure 2 and this means for example may take the form of a flexible snap spring part 16 secured to the free end of the flap portion 15 (Figures 2 and 3) and being so positioned that when the flap portion is in the full line position shown in Figure 2 this spring part 16 will yieldably engage the undersurface of the side part 10 to yieldably hold the flap portion 15 in cooperation with the tread.

In the light of the foregoing detail description of my improved tire cover, it will be readily evident that the tire cover is of such construction that it may be readily shoved downwardly onto a spare tire into proper tire protecting position thereon and thereafter the cover retaining means in the form of the hingedly supported flap portion 15 may be moved into engagement with that part of the tread not covered by the cover so as to retain the cover on the tire against accidental displacement therefrom.

Furthermore, the hinge connection for the flap portion 15 enables it to adjust itself to tires of slightly different diameters and configuration whereby the tire cover may be used on tires of slightly varying shapes and sizes.

Now, it is of course to be understood that although I have illustrated and described in detail the preferred embodiment of my invention, the invention is not to be thus limited but only insofar as defined by the scope and spirit of the appended claims.

I claim as my invention:

1. In a tire cover, a side part for covering a side wall of the tire, a tread covering portion adapted to extend substantially across the tread of the tire and formed not to extend about more than about one-half the outer periphery of the tire and a flap portion connected to said tread covering portion and, after the cover is on the tire, being movable into engagement with a portion of the tread of the tire not covered by said tread covering portion to retain the cover against accidental displacement on the tire, and an inwardly and radially projecting spring clip for yieldably engaging the side part associated with the free end of said flap portion for yieldably retaining it in tread covering position.

2. In a tire cover for a spare tire disposed in a fender well, a circular part for covering a side wall of a tire, a peripheral part extending laterally from said side part and formed to fit over the tread of the tire, said peripheral part being of such circumferential length as to extend about only one-half of the outer periphery of the tire whereby the cover may be shoved into tire protecting position on the tire and means associated with said peripheral part movable into engagement with the portion of the tread of the tire not covered by said peripheral part after the tire cover has been shoved into tire protecting position whereby the tire cover may thereafter be retained against accidental displacement from said tire, said means comprising a curved section constituting a continuaton of said peripheral part and being pivotally associated with said side and peripheral part, said curved section being of such circumferential length as to not only cover the exposed tire tread portion between said peripheral part and the fender well but to project into the well to prevent removal of the cover when the tire on which it is disposed is in the fender well.

3. In a tire cover, a side part for covering a side wall of the tire, a peripheral part extending laterally from said side part and being formed to fit over the tread of the tire, said peripheral part being of such circumferential length as to extend about only substantially one-half of the outer periphery of the tire, and means associated with said peripheral part for disposition over the tread portion not covered by said peripheral part movable into cooperation with said tread portion after the cover has been shoved on the tire, said means comprising a curved segment of transversely curved convex cross section embodying a portion comprising a circumferential continuation of said peripheral part and an inwardly extending marginal portion comprising a radial continuation of said side part, the lower end of each of said parts being cut away to accommodate said segment so that it will be symmetric with both of said parts.

4. In an annular tire cover of relatively resilient sheet metal, an annular face portion, and a combined tread, rear portion of channelled cross section partially secured thereto, the tread and rear portion being continuous and arcuate and greater than a semi-circle in length, a section of the edge of the tread and rear portion being integrally secured to a section of the edge of the face portion, the remaining sections of the edges being free so as to permit relative movement of the portions.

5. In a tire cover of relatively resilient sheet metal, a face portion and a combined tread and rear portion connected thereto, the tread and rear portion being continuous and arcuate and greater than a semi-circle in length, part of the tread and rear portion being secured to a section of the face portion, and another part of said tread and rear portion being free so as to permit relative movement of said portion in the application and removal of the cover to and from the tire.

GEORGE ALBERT LYON.